United States Patent
Kim et al.

[11] Patent Number: 5,939,806
[45] Date of Patent: Aug. 17, 1999

[54] DRIVE MOTOR FOR AN ELECTRIC VEHICLE

[75] Inventors: Ki-Nam Kim; Seung-Il Jang, both of Seoul, Rep. of Korea

[73] Assignee: Mando Machinery Corporation, Gunpo, Rep. of Korea

[21] Appl. No.: 08/993,039

[22] Filed: Dec. 18, 1997

[30] Foreign Application Priority Data

Dec. 23, 1996 [KR] Rep. of Korea ............... 96-54388
Dec. 27, 1996 [KR] Rep. of Korea ............... 97-75537

[51] Int. Cl.[6] .................... H02K 9/16; H02K 5/20
[52] U.S. Cl. ................ 310/60 A; 310/58; 310/63
[58] Field of Search ..................... 310/54, 60 A, 310/60 R, 58, 59, 61, 87, 88

[56] References Cited

U.S. PATENT DOCUMENTS 5,019,737  5/1991  Bruno ........................ 310/89

*Primary Examiner*—Nestor Ramirez
*Assistant Examiner*—Judson H. Jones
*Attorney, Agent, or Firm*—Staas & Halsey

[57] ABSTRACT

A drive motor for an electric vehicle includes a cylindrical housing, a cylindrical stator disposed within the housing, a coil wound around the stator, a rotor disposed within the stator, and front and rear covers respectively coupled on front and rear ends of the housing. The housing includes a cylindrical coolant passage concentrically formed around the stator in the housing, and the front or rear cover includes a coolant inlet port through which coolant is fed to the coolant passage and a coolant outlet port through which coolant circulated the coolant passage is exhausted.

11 Claims, 8 Drawing Sheets

DRIVE MOTOR FOR AN ELECTRIC VEHICLE

BACKGROUND OF THE INVENTION

1. Field of the Invention

The present invention relates to a drive motor for an electric vehicle and, more particularly, to a drive motor with a coolant passage for improving cooling efficiency.

2. Description of Related Art

Generally, an electric vehicle comprises a battery which is a source of electric energy and a drive motor which is supplied with electric energy from the battery to drive the vehicle.

When driving the vehicle, high-temperature heat is generated within the drive motor. Therefore, cooling means should be provided to cool the motor. The performance of the drive motor depends on the cooling efficiency of the cooling means.

FIG. 1 shows a perspective view of a conventional drive motor used in an electric vehicle.

As shown in FIG. 1, the drive motor comprises a cavity housing 10, a stator 11 around which a coil 12 is wound, the stator 11 being disposed within the housing 10, a rotor 13 disposed within the stator 11, and front and rear covers 14a and 14b for enclosing the hosing 10.

When electric power is applied to the coil 12 wound around the stator 11, the rotor 13 is rotated to drive the vehicle. At this point, high-temperature heat is generated within the motor. To cool the motor, coolant passages 15 are formed within the housing 10 and the front and rear covers 14a and 14b.

That is, as indicated by the arrows in FIG. 1, coolant is fed through an inlet port 16a formed on an upper surface of the front cover 14a, flows along the coolant passages 15 formed on the housing and front and rear covers 10, 14a, 14b, and finally is exhausted through an outlet port 16b formed in the upper surface of the front cover 14a. This circulation of the coolant is continuously performed, thereby cooling the drive motor.

However, in the above described conventional drive motor, since the coolant passages are formed in only four corners of the housing, the coolant cannot sufficiently cool the stator and coil, causing the motor to overheat.

In addition, the number of passages for circulation of the coolant makes it difficult to manufacture the motor. Furthermore, since the passages formed in the front and rear covers have to communicate with the coolant passages formed in the housing while maintaining a seal, a plurality of sealing members should be provided between the housing and the front and rear covers, making it difficult to assemble and disassemble the motor.

SUMMARY OF THE INVENTION

The present invention is made in an effort to solve the above described prior art problems.

It is an object of the present invention to provide a drive motor for an electric vehicle, which has a structure for improving cooling efficiency.

It is another object of the present invention to provide a drive motor for an electric vehicle, which has a coolant passage which can be easily processed, thereby simplifying manufacturing process.

According to one aspect of the present invention, a drive motor for an electric vehicle, comprising a cylindrical housing; a cylindrical stator disposed within the housing; a coil wound around the stator; a rotor disposed within the stator; and front and rear covers respectively coupled on front and rear ends of the housing, wherein said housing comprises a cylindrical coolant passage concentrically formed around the stator in the housing; and said front cover comprises a coolant inlet port through which coolant is fed to the coolant passage and a coolant outlet port through which coolant circulated the coolant passage is exhausted. A circumference communicating portion is concentrically formed on a front end of the coolant passage proximate to the front cover, the circumference communicating portion communicating with the inlet and outlet ports.

Preferably, the diameter of the communicating portion is larger than that of the coolant passage such that a circumference stepped portion is formed between the coolant passage and the communicating portion.

Preferably, the drive motor further comprises a sealing member inserted into the communicating portion such that it can be seated on the stepped portion so as to prevent coolant from being leaked between the front cover and the front end of the housing.

Preferably, the sealing member comprises a first connecting inlet port corresponding to the inlet port of the front cover and a first connecting outlet port corresponding to the outlet port.

The drive motor further comprises a supporting ring disposed between the sealing member and the communicating portion so that the sealing member is prevented from being forced into the coolant passage.

Preferably, the supporting ring comprises second connecting inlet and outlet ports respectively corresponding to the first connecting inlet and outlet ports.

According to another aspect of the present invention, a drive motor for an electric vehicle comprising a cylindrical housing; a cylindrical stator disposed within the housing; a coil wound around the stator; a rotor disposed within the stator; and front and rear covers respectively coupled on front and rear ends of the housing. Said housing comprises a cylindrical coolant passage concentrically formed around the stator in the housing, and inlet and outlet holes formed on the rear end of the housing; and said rear cover comprises a coolant inlet port through which coolant is fed to the coolant passage via the inlet hole and a coolant outlet port through which coolant circulated through the coolant passage is exhausted through the outlet hole.

The drive motor further comprises first and second sealing rings respectively disposed between the inlet port and the inlet hole and between the outlet port and the outlet hole.

Preferably, a circumference communicating portion is concentrically formed on a front end of the coolant passage proximate to the front cover, the circumference communicating portion communicating with the inlet and outlet ports.

Preferably, a diameter of the communicating portion is larger than that of the coolant passage such that a circumference stepped portion is formed between the coolant passage and the communicating portion.

The drive motor further comprises a sealing member inserted into the communicating portion such that it can be seated on the stepped portion so as to prevent coolant from being leaked between the front cover and the front end of the housing, and a supporting ring between the sealing member and the communicating portion so that the sealing member is prevented from being forced into the coolant passage.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Preferred embodiments of the present invention will now be described in detail with reference to the accompanying drawings.

Figure 1:
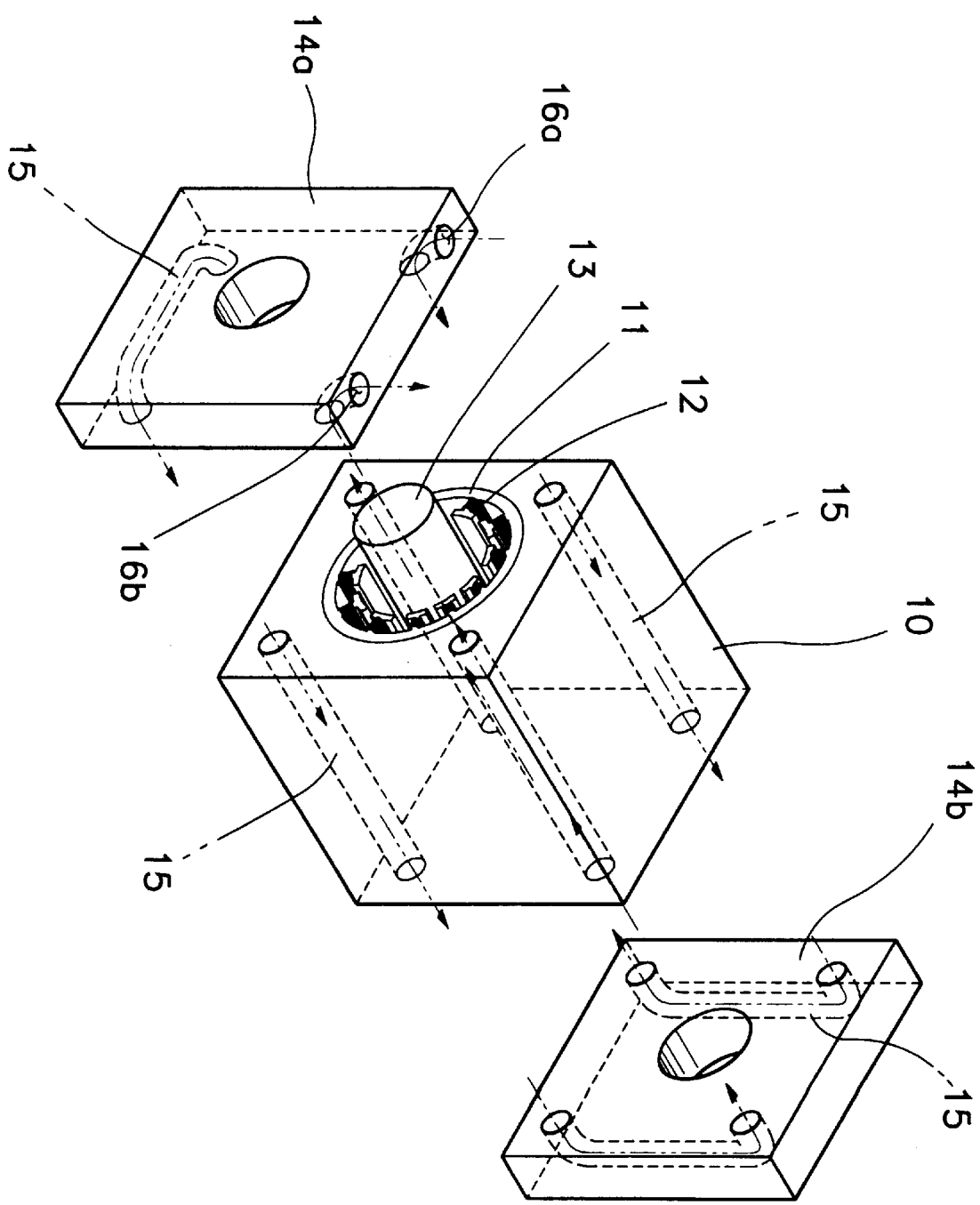
FIG. 1 is an exploded perspective view of a conventional drive motor for an electric vehicle.
Figure 2:
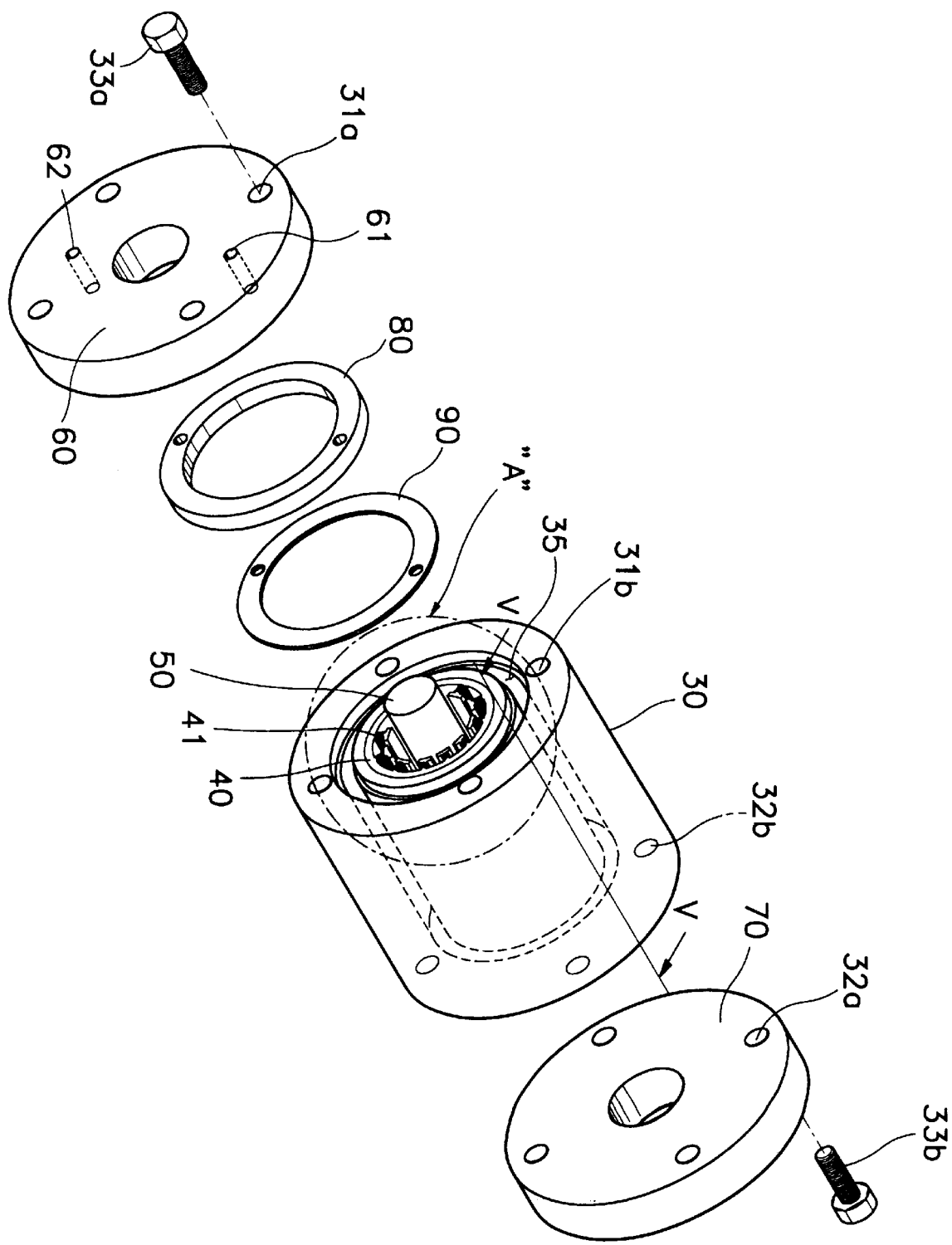
FIG. 2 is an exploded perspective view of a drive motor of an electric vehicle according to a first embodiment of the present invention.
Figure 3:
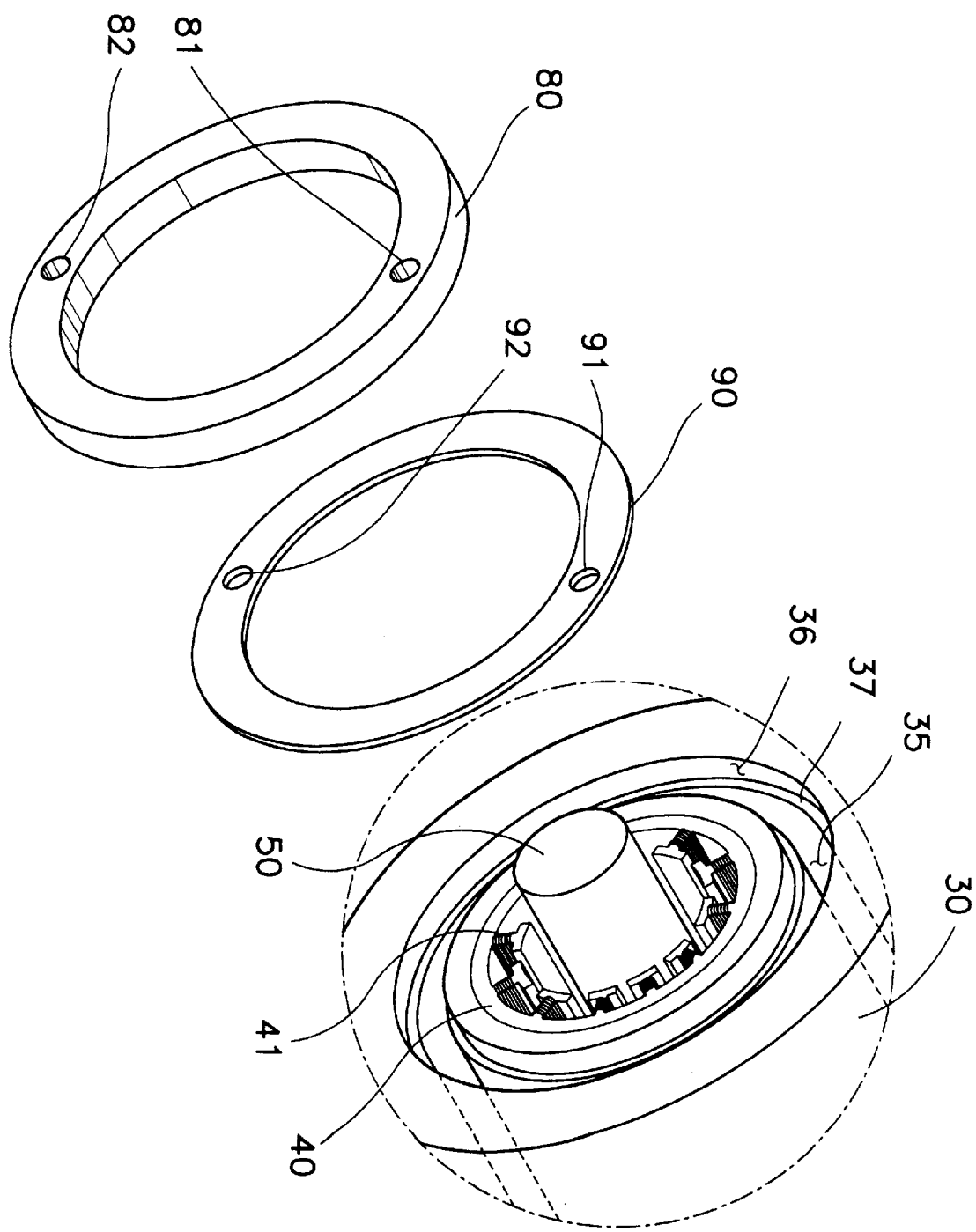
FIG. 3 is an enlarged view showing a circled portion A of FIG. 2.
Figure 4:
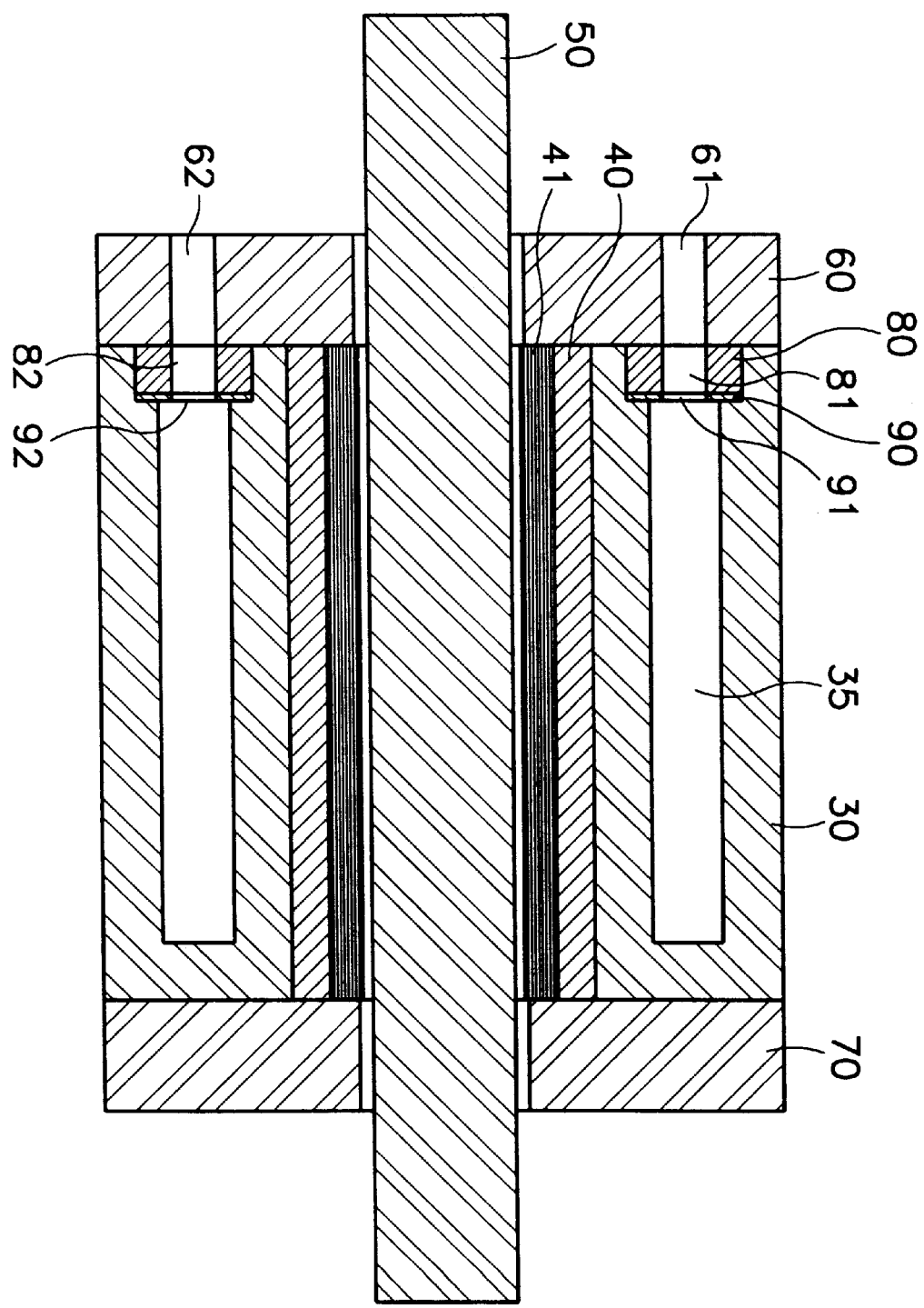
FIG. 4 is a sectional view taken along line IV—IV of FIG. 2.

Referring to FIGS. 2, 3 and 4, there are shown views illustrating a drive motor of an electric vehicle according to a first embodiment of the present invention.

The drive motor of this embodiment comprises a cylindrical housing 30, a cylindrical stator 40 disposed within the housing 30, a coil 41 wound around the stator 40, and a rotor 50 disposed within the stator 40. Front and rear covers 60 and 70 are respectively coupled on front and rear ends of the housing by a plurality of front and rear bolts 33a and 33b, thereby sealing the housing 130.

The front bolts 33a are coupled through nut holes 31a and 31b which are respectively formed on the front cover 60 and the front end of the housing 30, while the rear bolts 33b are coupled through nut holes 32a and 32b which are respectively formed on the rear cover 70 and the rear end of the housing 30.

The rotor 50 of the drive motor is connected to a power transmission system connected to drive wheels of the electric vehicle. Therefore, when electric current flows from a battery to the coil 41 wound around the stator 40, the rotor 50 is rotated by electric power. Therefore, the power transmission system transmits rotating power of the rotor 50 to the drive wheels.

At this point, since high temperature heat is generated within the motor, a cooling device for cooling the motor is required. The cooling device of the drive motor according to the first embodiment of the present invention will be described hereinafter.

A cylindrical coolant passage 35 is concentrically formed around the stator 40 in the housing 30. The coolant passage 35 is opened at the front end of the housing 30.

The front cover 60 is provided at its upper side with a coolant inlet port 61 and at its lower side with a coolant outlet port 62. As shown in FIG. 3, a circumference communicating portion 36 is concentrically formed on a front end, that is, a portion proximal to the front cover 60, of the coolant passage 35. A diameter of the communicating portion 36 is larger than that of the coolant passage 35. Accordingly, a circumference stepped portion 37 is formed between the coolant passage 35 and the communicating portion 36. A sealing member 80 and a supporting ring 90 are seated on the stepped portion 36. This will be described more in detail hereinafter.

When the front cover 60 is coupled on the front end of the housing 60, the communicating portion 36 of the coolant passage 35 communicates with the inlet and outlet ports 61 and 62 of the front cover 60. At this point, to prevent coolant leakage between the front cover 60 and the housing 30, the sealing member 80 is disposed between the housing 30 and the front cover 60. The sealing member 80 is inserted into the communicating portion 36 such that it can be seated on the stepped portion 37. The sealing member 80 is provided with a first connecting inlet port 81 corresponding to the inlet port 61 of the front cover 60 and a first connecting outlet port 82 corresponding to the outlet port 62.

That is, the coolant induced through the inlet port 61 is fed to the coolant passage 35 through the first connecting inlet port 81 and is then exhausted through the outlet port 62 and the first connecting outlet port 82.

However, since the sealing member 80 is generally made of rubber material, when the coolant is fed to the coolant passage 35 through the first connecting inlet port 81 of the sealing member 80, the sealing member 80 may be forced into the coolant passage 35 due to the flowing force of the coolant. To prevent this, in the present invention, there is provided the supporting ring 90 between the sealing member 80 and the communicating portion 36. The supporting ring 90 is also provided with second connecting inlet and outlet ports 91 and 92 respectively corresponding to the first connecting inlet and outlet ports 81 and 82.

The operation of the above described drive motor will be described hereinafter.

When electric current is applied to the coil 41 wound around the stator 40, the rotor 50 is rotated by electric power. Rotating force of the rotor 50 is transmitted to the drive wheels (not shown) via the power transmission system. During this operation, the coolant is fed to the coolant passage 35 of the housing 30 via the inlet port 61 of the front cover, the first connecting inlet port 81 of the sealing member 80, and the second connecting inlet port 91 of the supporting ring 90. The coolant fed to the coolant passage 35 circulates therein and is exhausted through the second connecting outlet port 92 of the supporting ring 90, the first connecting outlet port 82 of the sealing member 80, and the outlet port 62 of the front cover 60.

Figure 5:
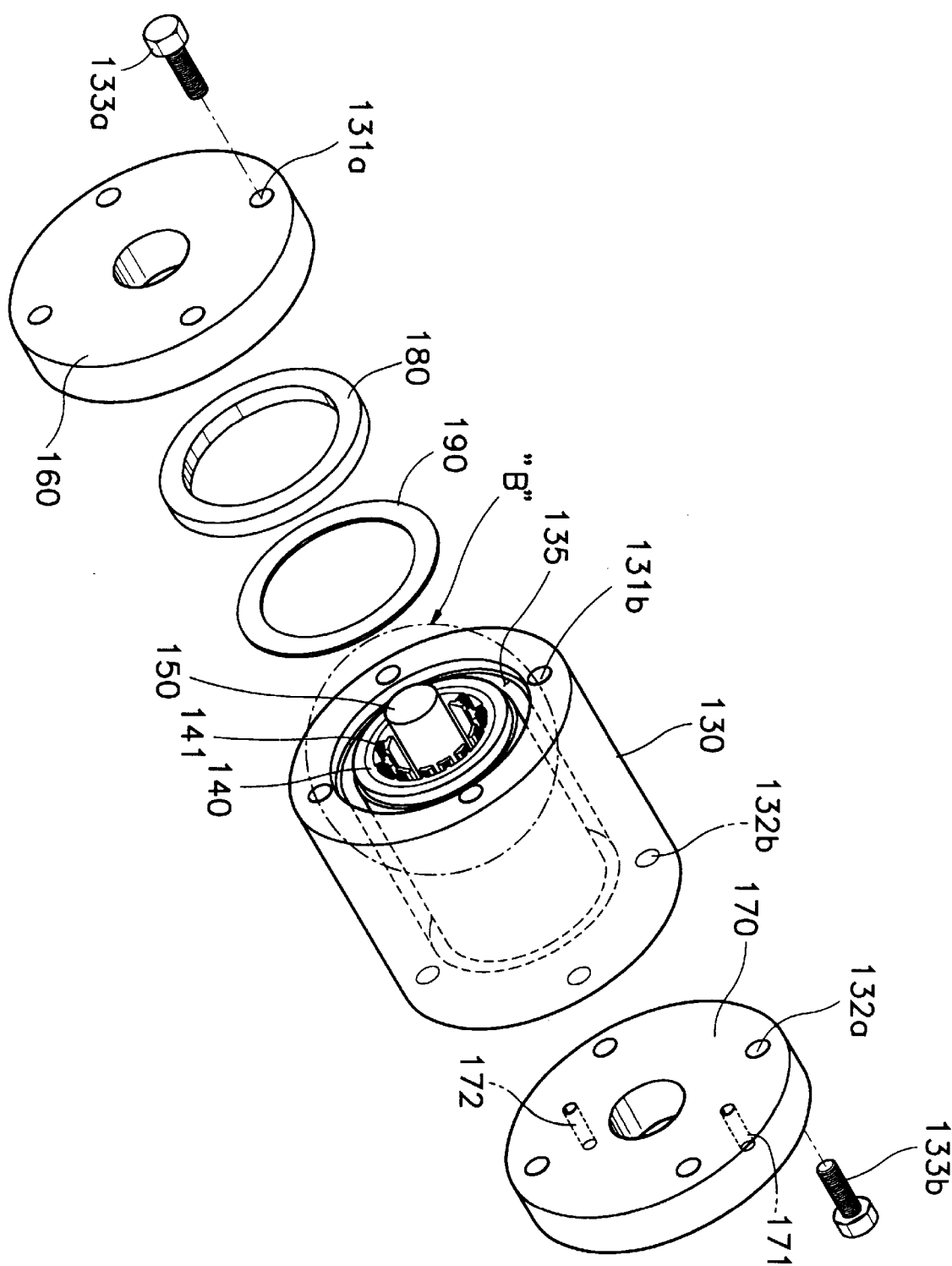
FIG. 5 is an exploded perspective view of a drive motor of an electric vehicle according to a second embodiment of the present invention.
Figure 6:
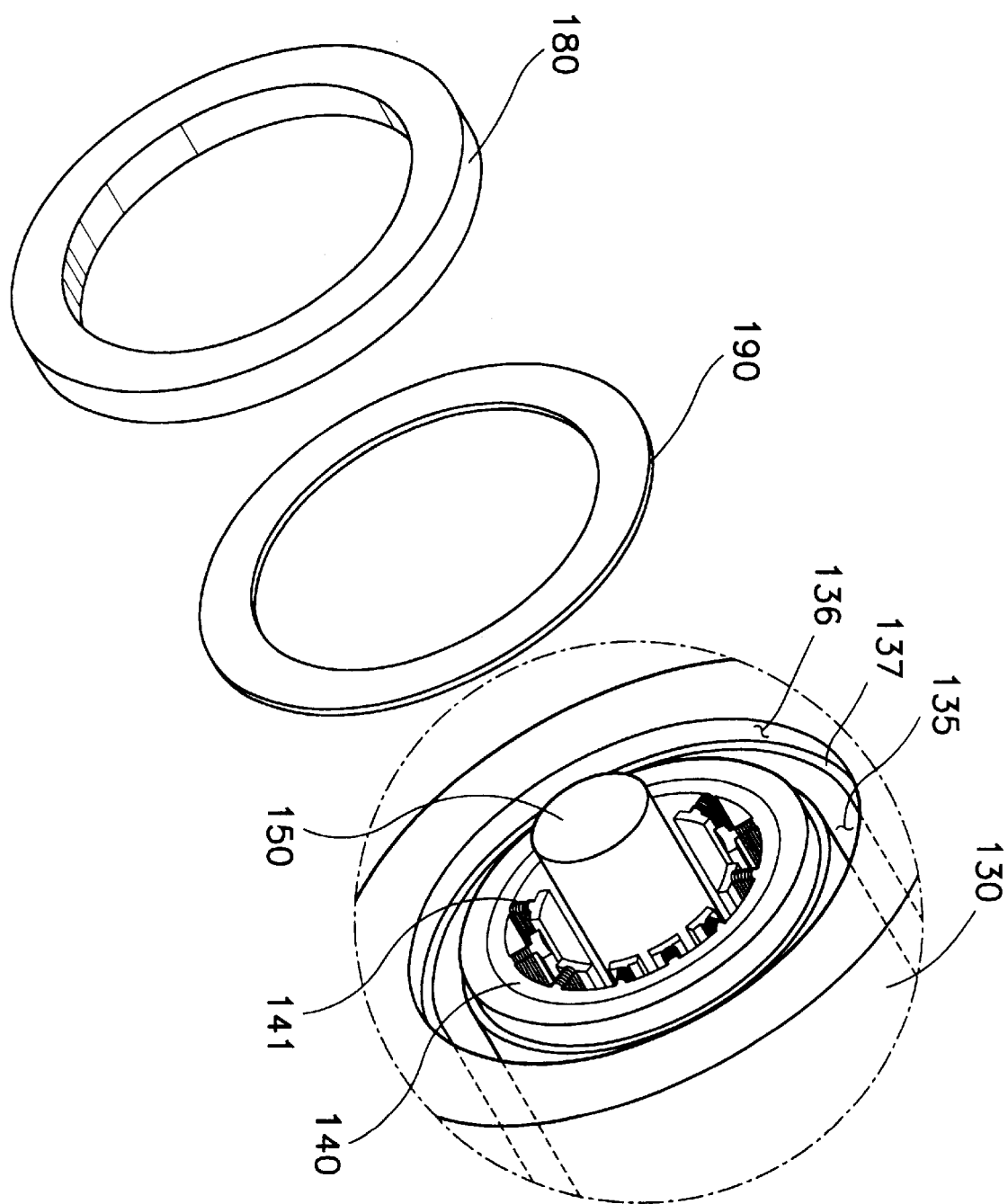
FIG. 6 is an enlarged view showing a circled portion B of FIG. 5.
Figure 7:
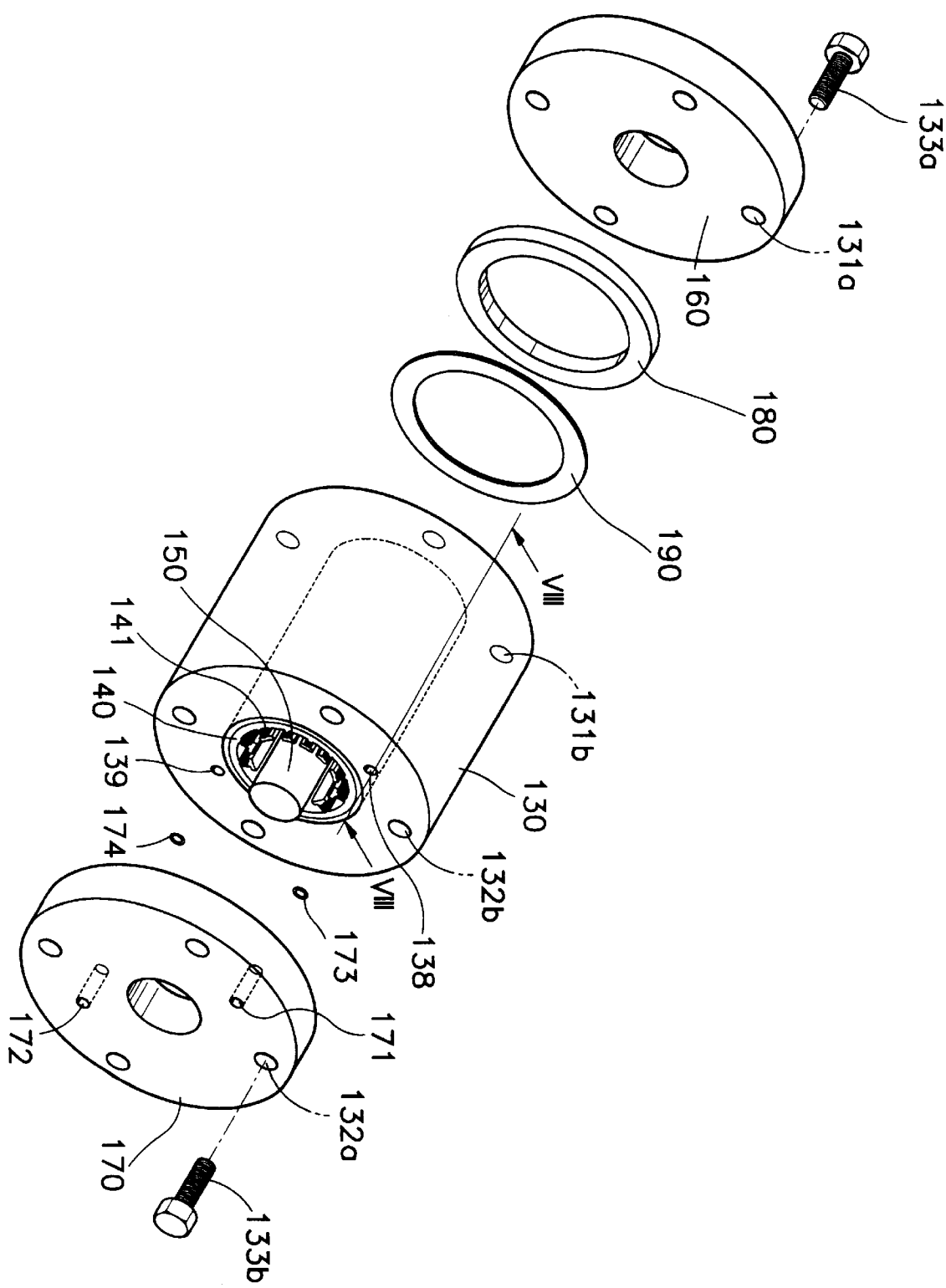
FIG. 7 is a rear exploded perspective view of a drive motor of FIG. 5.
Figure 8:
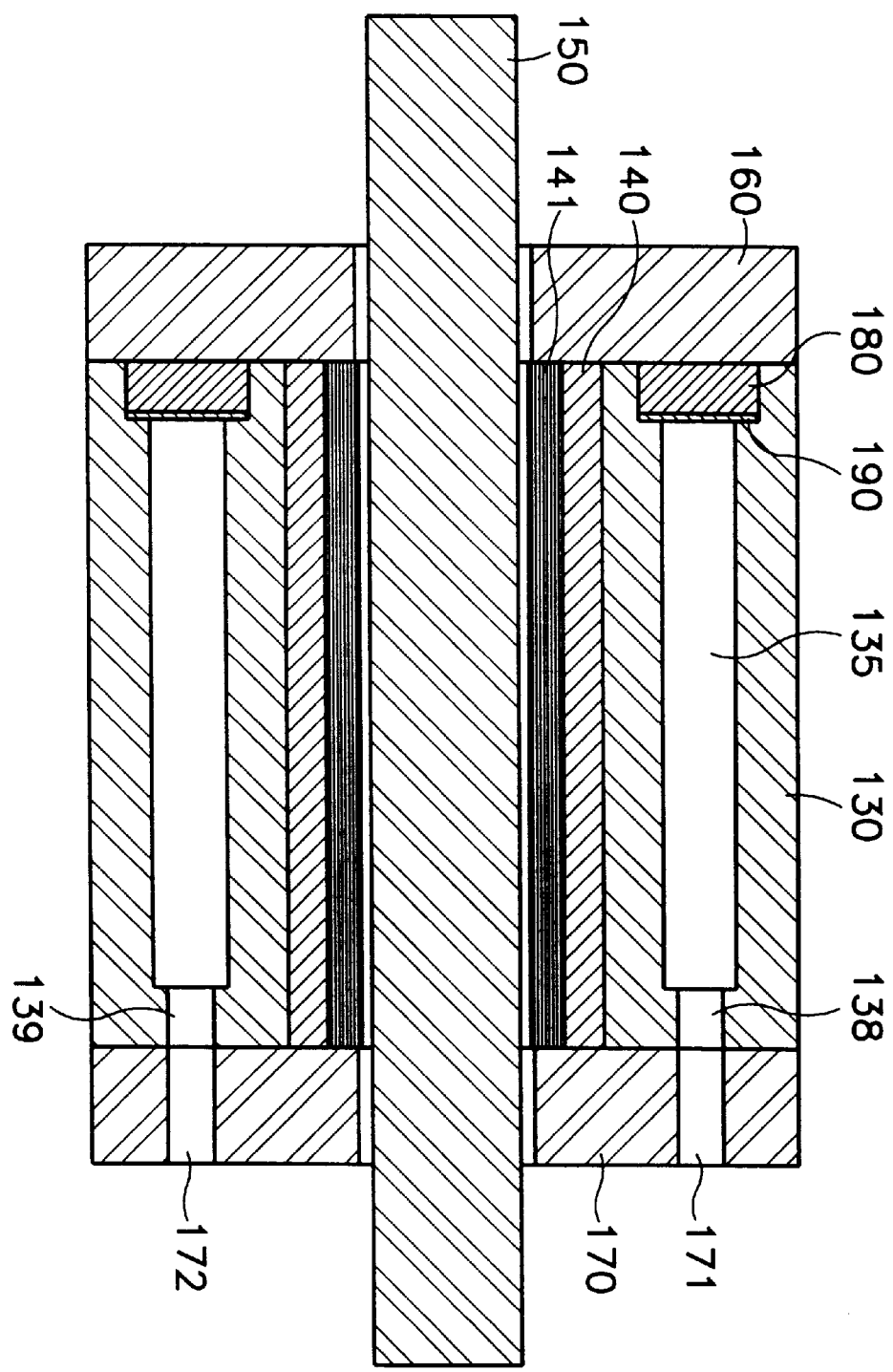
FIG. 8 is a sectional view taken along line VIII—VIII of FIG. 7.

Referring to FIGS. 5, 6 and 7, there are shown views illustrating a drive motor of an electric vehicle according to a second embodiment of the present invention.

The drive motor of this embodiment comprises a cylindrical housing 130, a cylindrical stator 140 disposed within the housing 130, a coil 141 wound around the stator 140, and a rotor 150 disposed within the stator 140. Front and rear covers 160 and 170 are respectively coupled on front and rear ends of the housing by a plurality of front and rear bolts 133a and 133b, thereby sealing the housing 130.

The front bolts 133a are coupled through nut holes 131a and 131b which are respectively formed on the front cover 160 and the front end of the housing 130, while the rear bolts 133b are coupled through nut holes 132a and 132b which are respectively formed on the rear cover 170 and the rear end of the housing 130.

The rotor 150 of the drive motor is connected to a power transmission system connected to drive wheels of the electric vehicle. Therefore, when electric current flows from a battery to the coil 141 wound around the stator 140, the rotor 150 is rotated by electric power. Rotating force of the rotor 150 is transmitted to the drive wheels via the power transmission system.

At this point, since high-temperature heat is generated within the motor, a cooling device for cooling the motor is required. The cooling device of the drive motor according to the second embodiment of the present invention will be described hereinafter.

A cylindrical coolant passage 135 is concentrically formed around the stator 140 in the housing 130. The coolant passage 135 is opened at the front end of the housing 130.

The rear cover 170 is provided at its upper side with a coolant inlet port 171 and at its lower side with a coolant outlet port 172. As shown in FIG. 7, inlet and outlet holes 138 and 139 respectively corresponding to the inlet and outlet ports are formed through the rear end of the housing 130. Sealing rings 173 and 174 are respectively disposed between the inlet port 171 and the inlet hole 138 and between the outlet port 172 and the outlet hole 139.

That is, the coolant induced through the inlet port 171 is fed to the coolant passage 135 through the inlet hole 138 and is then exhausted through the outlet port 172 and the outlet hole 139.

A circumference communicating portion 136 is concentrically formed on a front end, that is, a portion proximal to the front cover 160, of the coolant passage 35. A diameter of the communicating portion 136 is larger than that of the coolant passage 135. Accordingly, a circumference stepped portion 137 is formed between the coolant passage 135 and the communicating portion 136. A sealing member 180 and a supporting ring 190 are seated on the stepped portion 136. This will be described more in detail hereinafter.

When the front cover 160 is coupled on the front end of the housing 160, the communicating portion 136 of the coolant passage 135 communicates with the inlet and outlet ports 161 and 162 of the front cover 160. At this point, to prevent coolant leakage between the front cover 160 and the housing 130, the sealing member 180 is disposed between the housing 130 and the front cover 160. The sealing member 180 is inserted into the communicating portion 136 such that it can be seated on the stepped portion 137.

However, since the sealing member 180 is generally made of rubber material, the sealing member 180 may be forced into the coolant passage 153 due to the flowing force of the coolant. To prevent this, in the present invention, there is provided the supporting ring 190 between the sealing member 180 and the communicating portion 136.

The operation of the above described drive motor will be described hereinafter.

When electric current is applied to the coil 141 wound around the stator 140, the rotor 140 is rotated by electric power. Rotating force of the rotor 150 is transmitted to the drive wheels (not shown) via the power transmission system. During this operation, the coolant is fed to the coolant passage 135 of the housing 130 via the inlet port 171 of the rear cover 170 and the inlet hole 138 of the housing 130. The coolant fed to the coolant passage 135 circulates therein and is exhausted through the outlet hole 139 of the housing 135 and the outlet port 172 of the rear cover 172.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A drive motor for an electric vehicle, comprising:
   a cylindrical housing;
   a cylindrical stator disposed within the housing:
      a coil wound around the stator;
      a rotor disposed within the stator; and
      front and rear covers respectively coupled on front and rear ends of the housing,
      wherein said housing comprises a cylindrical coolant passage concentrically formed around the stator in the housing;
      said front cover comprises a coolant inlet port through which coolant is fed to the coolant passage and a coolant outlet port through which coolant circulated in the coolant passage is exhausted;
      a circumference communicating portion is concentrically formed on a front end of the coolant passage proximate to the front cover, the circumference communicating portion communicating with the inlet and outlet ports; and
      a diameter of the circumference communicating portion is larger than that of the coolant passage such that a circumference stepped portion is formed between the coolant passage and the circumference communicating portion.

2. A drive motor of claim 1, wherein the cylindrical coolant passage is concentrically formed around a stator in the housing, one end of which is fully opened and another end of which is fully closed, the front cover is coupled on the open-ended portion of the housing, and the rear cover is coupled on the closed-ended portion of the housing.

3. A drive motor of claim 2 further comprising a sealing member inserted into the communicating portion such that it can be seated on the stepped portion so as to prevent coolant from being leaked between the front cover and the front end of the housing.

4. A drive motor of claim 3, wherein the sealing member comprises a first connecting inlet port corresponding to the inlet port of the front cover and a first connecting outlet port corresponding to the outlet port.

5. A drive motor of claim 3 further comprising a supporting ring disposed between the sealing member and the communicating portion so that the sealing member is prevented from being forced into the coolant passage.

6. A drive motor of claim 5, wherein the supporting ring comprises second connecting inlet and outlet ports respectively corresponding to the first connecting inlet and outlet ports.

7. A drive motor for an electric vehicle, comprising:
   a cylindrical housing;
   a cylindrical stator disposed within the housing:
      a coil wound around the stator;
      a rotor disposed within the stator; and
      front and rear covers respectively coupled on front and rear ends of the housing,
      wherein said housing comprises a cylindrical coolant passage concentrically formed around the stator in the housing, and inlet and outlet holes formed on the rear end of the housing;
      said rear cover comprises a coolant inlet port through which coolant is fed tot the coolant passage via the inlet hole and a coolant outlet port through which coolant circulated in the coolant passage is exhausted through the outlet hole;

first and second sealing rings are respectively disposed between the inlet port and the inlet hole and between the outlet port and the outlet hole; and the cylindrical coolant passage is concentrically formed around a stator in the housing, one end of which is fully opened and another end of which is fully closed, the front cover is coupled on the open-ended portion of the housing, and the rear cover is coupled on the closed-ended portion of the housing.

8. A drive motor of claim 7, wherein a circumference communicating portion is concentrically formed on a front end of the coolant passage proximate to the front cover, the circumference communicating portion communicating with the inlet and outlet ports.

9. A drive motor of claim 8, wherein a diameter of the communicating portion is larger than that of the coolant passage such that a circumference stepped portion is formed between the coolant passage and the communicating portion.

10. A drive motor of claim 9 further comprising a sealing member inserted into the communicating portion such that it can be seated on the stepped portion so as to prevent coolant from being leaked between the front cover and the front end of the housing.

11. A drive motor of claim 10 further comprising a supporting ring between the sealing member and the communicating portion so that the sealing member is prevented from being forced into the coolant passage.

* * * * *